No. 686,614. Patented Nov. 12, 1901.
C. HUTCHINSON.
COCK OR VALVE FOR CASKS, BARRELS, &c.
(Application filed Mar. 22, 1901.)
(No Model.)
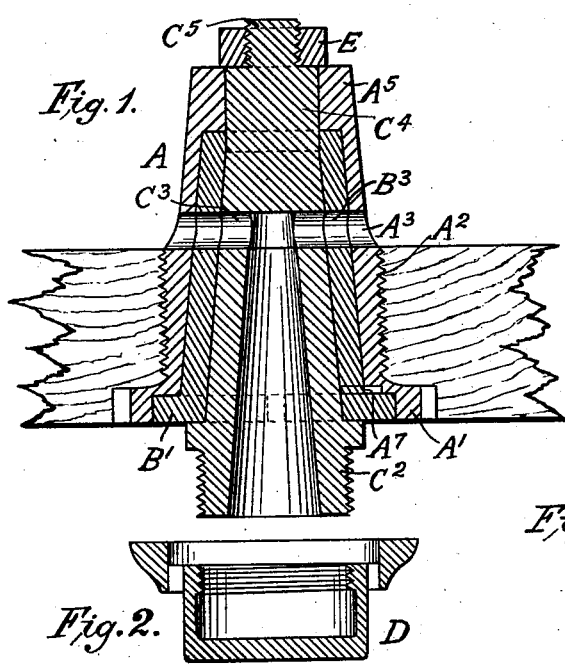
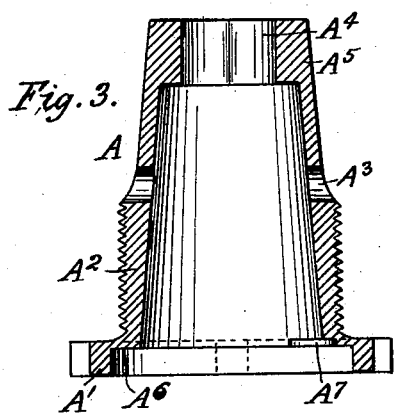
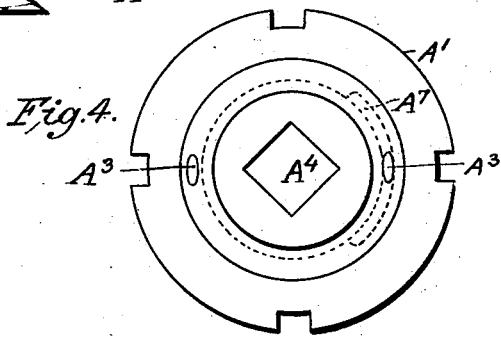
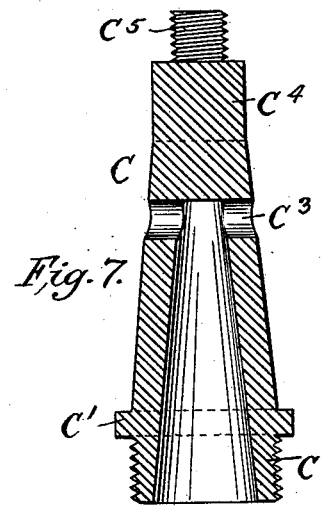
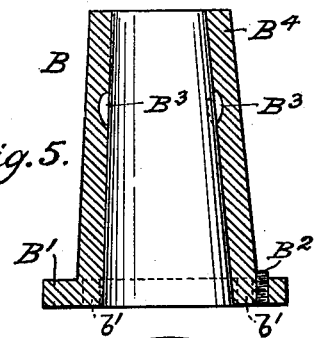
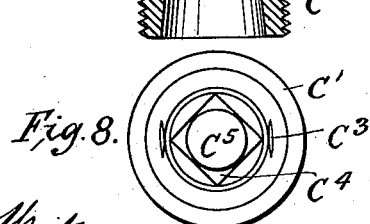
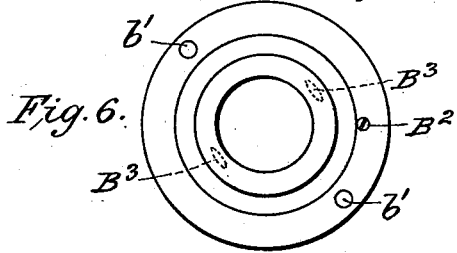
Witnesses
Inventor
Charles Hutchinson

UNITED STATES PATENT OFFICE.

CHARLES HUTCHINSON, OF HOLLOWAY, LONDON, ENGLAND.

COCK OR VALVE FOR CASKS, BARRELS, &c.

SPECIFICATION forming part of Letters Patent No. 686,614, dated November 12, 1901.

Application filed March 22, 1901. Serial No. 52,329. (No model.)

*To all whom it may concern:*

Be it known that I, CHARLES HUTCHINSON, traveler, a subject of the King of Great Britain, residing at 547 Liverpool road, Holloway, in the county of London, England, have invented certain new and useful Improvements in Cocks or Valves for Casks, Barrels, and the Like, of which the following is a specification.

This invention relates to cocks or valves which can be permanently fixed to casks, barrels, or the like vessels of large capacity, such as are known in the brewing trade as "cellar-casks," and adapted for containing liquids under pressure, the contents of said casks being delivered through suitable pipes to a bar, counter, or other draw-off point generally located at some little distance away from the cellar or other place where the cask is stored.

The object of this invention is to construct a cock or valve of the kind indicated in such a manner that when fitted it is mainly located inside the cask or barrel, and consequently is not liable to be damaged in the transit of the cask or barrel to or from the cellar or other place.

My improved cock or valve is of tubular form, but differs from other tubular valves in having three concentric tubes with corresponding lateral apertures, the inner and outer tubes being fixed in position, while the intermediate tube is rotatable to open or close the valve, the liquid being delivered longitudinally through the center of the inner tube. The tubes are preferably made to taper inward, but this is not essential. They may be cylindrical, if so desired.

In the accompanying drawings, Figure 1 is a section showing my improved cock or valve fixed to a cask or barrel, and Fig. 2 is a section of the detachable screw-cap therefor. Fig. 3 is a detached sectional elevation of the outer tube, and Fig. 4 is a plan of same. Figs. 5, 6, 7, and 8 are similar views of the intermediate and inner tubes, respectively.

The same letters of reference where they occur are used to denote the same or corresponding parts in the several views.

The outer tube A, Figs. 3 and 4, is provided with an outer or top flange $A'$, an external screw-thread $A^2$, lateral apertures $A^3$, and a square aperture $A^4$ in its bottom or inner end $A^5$. The flange $A'$ is also internally recessed, as shown at $A^6$, and beneath this recess is an undercut and curved slot $A^7$. This outer tube A is secured in the cask by means of the screw $A^2$, the flange $A'$ fitting into a recess made in the outer face of the cask to receive it.

The intermediate tube B, Figs. 5 and 6, is provided with a top flange $B'$, which fits in the internal recess $A^6$ of the outer tube A, and projecting below said flange $B'$ is a pin $B^2$, which is preferably made threaded and passed through a tapped hole, as shown in Fig. 5, so as to facilitate the guiding in of the tubes. Said pin $B^2$ engages the undercut slot $A^7$ in the tube A, and thereby acts as a stop to limit the rotation of the intermediate tube B. The said tube B is provided with lateral apertures $B^3$, corresponding with those in the tube A, and its bottom or inner end $B^4$ is open and takes a bearing on the inside of the bottom $A^5$ of the tube A, as shown in Fig. 1. The intermediate tube B is rotated by means of a suitable tool engaging recesses $b'$ in the outer face of the flange $B'$.

The inner tube C, Figs. 7 and 8, is provided with a flange $C'$, which rests on the outer face of the flange $B'$ of the intermediate tube B, or it may lie in a recess made to receive it in the said flange $B'$, and beyond this flange $C'$ the tube is extended outwardly and is externally threaded at $C^2$, so that the pipe or conduit by which the liquid is to be delivered may be coupled thereto by an ordinary union or other suitable coupling device. When not so coupled, the screw-cap D (shown in Fig. 2) is screwed onto the threaded end $C^2$ of the inner tube C to prevent dirt and dust getting into the interior of the cock or valve. The inner tube C is also provided with lateral apertures $C^3$, corresponding with those in the tubes A and B, and its bottom or inner end is squared, as shown at $C^4$, to fit the squared aperture $A^2$ in the outer tube. A stem $C^5$ projects from this squared end $C^4$ beyond the outer tube and is screw-threaded, and a nut E, engaging said screw-threaded stem $C^5$, serves to keep all the parts of the cock or valve in position when they are assembled together in the manner shown in Fig. 1.

From the foregoing description it will be understood that the inner tube C is fixed in position by its squared end $C^4$ to the outer tube A and that the intermediate tube B can be rotated between the tubes A and C within the limits fixed by the stop-pin $B^2$ and slot $A^7$. Consequently when the valve is opened the liquid flowing through the lateral apertures $A^3$, $B^3$, and $C^3$ is delivered longitudinally through the bore of the non-rotatable inner tube A. It is thus possible to couple said inner tube to the end of a length of fixed piping, which cannot be done when the delivery-tube rotates as in all other tubular valves as hitherto made and used.

The improved cock or valve hereinbefore described can be attached either to the tap-hole or bung-hole of a cask, barrel, or the like and can be used, first, for racking beer into casks either through the bung or tap holes by attaching to the outer screwed extension $C^2$ on the valve a hose connected with the racking-tank, by which means the beer can be racked direct into the cask from the racking-tank without loss of gas from the beer and without the beer coming into contact with the air or being racked with an admixture thereof; second, for drawing off the beer from the cask through the same valve for consumption in public houses or otherwise by attaching a drawing-off hose connected with the beer-engines or other means of drawing in the same manner as for racking, thus affording an easy and simple means of drawing beer under pressure without escape of gas or loss of pressure, and, third, for drawing off the beer in private houses for domestic consumption by means of a faucet screwed onto the screwed extension $C^2$ and a key for rotating the intermediate tube B. When said key is turned, it opens the port $B^3$ in tube B and allows the beer to flow through, and when reversed closes the port, the faucet then being removed with the port closed, constituting a locked tap, without which the beer cannot be drawn off from the cask.

The use of this valve and faucet will obviate the cumbrous, wasteful, and unsatisfactory method of tapping beer by the usual brass or metal cock, which requires to be wrapped around with brown paper or other packing and generally results in losing part of the contents as well as affecting the condition of the beer.

By the use of this valve the ordinary bung and tap corks are dispensed with, and as the port is closed before detachment of the faucet or supply or delivery pipe, as the case may be, admission of air to the cask is prevented and the cask kept sweet and sound.

Having fully described my invention, what I claim, and desire to secure by Letters Patent, is—

1. A tubular valve comprising three concentric tubes having corresponding lateral apertures the inner and outer tubes being secured together while the intermediate tube is rotatable between them, the delivery end of the inner tube having a projection adapted to be coupled to fixed supply or delivery piping or to a delivery-faucet substantially as described.

2. A tubular valve comprising an outer tube having a square aperture in its inner end, an intermediate tube rotatably mounted in said outer tube, an inner tube having a screw-threaded projection on its delivery end, a closed inner end of square shape fitting the squared aperture in the outer tube and fixed thereto by screw and nut or other suitable means, and corresponding lateral apertures in all three tubes, substantially as and for the purpose hereinbefore described.

CHARLES HUTCHINSON.

Witnesses:
G. D. NEVILLE,
WALTER J. SKERTEN.